United States Patent [19]
El-Shall

[11] Patent Number: 5,449,464
[45] Date of Patent: * Sep. 12, 1995

[54] DEWATERING METHOD AND AGENT

[75] Inventor: Hassan E. El-Shall, Valrico, Fla.

[73] Assignee: Florida Institute of Phosphate Research, Bartow, Fla.

[ * ] Notice: The portion of the term of this patent subsequent to Nov. 16, 2010 has been disclaimed.

[21] Appl. No.: 150,995

[22] Filed: Nov. 12, 1993

Related U.S. Application Data

[63] Continuation-in-part of Ser. No. 765,664, Sep. 26, 1991, Pat. No. 5,262,064.

[51] Int. Cl.$^6$ ................................. C02F 1/56
[52] U.S. Cl. .................................. 210/727; 210/728; 210/747; 210/778; 299/7; 209/5
[58] Field of Search ............... 210/702, 726, 727, 728, 210/730, 712, 713, 734, 747, 609, 778; 299/7; 205/5; 252/60, 175, 176, 180

[56] References Cited

U.S. PATENT DOCUMENTS

| | | | |
|---|---|---|---|
| 2,075,542 | 3/1937 | Pruyn | 210/203 |
| 4,260,488 | 4/1981 | Condolios | 210/259 |
| 4,559,143 | 12/1985 | Asada et al. | 210/778 |
| 4,710,298 | 12/1988 | Noda | 210/505 |
| 4,931,190 | 6/1990 | Laros | 210/710 |
| 5,277,368 | 1/1994 | Kindig | 209/211 |

FOREIGN PATENT DOCUMENTS 844509 1/1977 Belgium .
60-22798 11/1985 Japan .

OTHER PUBLICATIONS

Pub. 02-107-021 "The State of the Art of Phosphatic Clay Dewatering Technology and Disposal Techniques" Dep. of Int., Bur. of Mines Dec. 1983.
Report No. 661 titled "Disposal of Phosphate Tailing," Davenport et al., (1953).
Nalco Chemical Company product bulletin titled "NALCO ® 7877 Mineral Processing Flocculant".
"Percol 156 Anionic Flocculant", Allied Colloids.
"Poly Plus Product Facts", Betz Paperchem (1981).
S. E. Sankey et al., "The Structure-Property Relationship of Polymers Used in Red Mud Flocculation" 111th AIME annual Meeting, Dallas, Texas (1982).
B. K. Asddell, "Wet Processing of Kaolin", *Society of Mining Engineers Transactions*, 1967, pp. 467-474.
"Kaolin" advertising brochure, Comalco.
Paint Filter Liquids Test-Method 9095.
Chandler, J. L., "Dewatering Red Mud by Deep Thickening and Solar Evaporation", *Flocculation and Dewatering, pp. 539-549 (1988)*.
International Search Report for PCT/US92/08032.
Investigation 8611 titled "Large Scale Dewatering of Phosphatic Clay Waste from Central Florida," Schriner et al., U.S. Dept. of Int., Bur. of Mines.
Investigation No. 8349 titled "Flocculation Dewatering of Florida Phosphatic Clay Wastes" Smelley et al., pub. U.S. Dept. of Int. Bur. of Mines.
Information Circular 8668 titled "The Florida Phosphate Slimes Problem" pub. by the U. S. Dept. of Int. Bur. of Mines.

*Primary Examiner*—Neil McCarthy
*Attorney, Agent, or Firm*—Rothwell, Figg, Ernst & Kurz

[57] ABSTRACT

A method of dewatering mineral-containing sludge by adding to the sludge (a) an aqueous solution or emulsion of acrylamide polymer flocculating agent and (b) a microfiber additive. By using this method, such mineral-containing sludges can be quickly dewatered into a cake having 25-35% solids which can then be further processed to a 60% solids-containing material. The method is particularly suitable for use in methods for treating, recovering, rehabilitating and recycling residue of mining operations. The method also enhances the filtration characteristics of certain mineral residues. With modification, the method is also suitable for dewatering organic sludges. Kaolin clay and red mud from the Bayer process are disclosed among the mineral-containing sludges which may be dewatered in accordance with the process of the invention.

35 Claims, 2 Drawing Sheets

DEWATERING METHOD AND AGENT

This application is a continuation-in-part application of Ser. No. 07/765,664, filed Sep. 26, 1991, now U.S. Pat. No. 5,262,064.

BACKGROUND

1. Field of the Invention

The invention relates to dewatering methods and agents used in these methods, especially those methods and agents used for dewatering sludges.

2. Background Art

Dewatering of various types of sludges, such as mineral sludges generated by phosphatic ore mining, has been a subject of intense research due to the economic and environmental impact of disposing of the sludges or, alternatively, of recovering the solids from the sludges by dewatering processes. For instance, the mining and processing of phosphatic ores (apatites) in Florida generates an estimated 100,000 tons of phosphatic waste clay solid suspensions each day. Such suspensions, which are generated as sludge-like slurries, contain 3 to 10% solids, and have historically been pumped to large, above-ground holding ponds where water is decanted through spillways as the solids slowly consolidate under the impact of gravity to a 15–18% solids level. At this solids level the ponds slowly dehydrate and form a crust on their surface which retards further surface evaporation. Without additional physical efforts to dewater the mass, it then may take several decades to consolidate the crusted pond to a solids content of 25–35%. Because as much as 60% of the land surface in a mining area is covered with these ponds, they represent a considerable economic penalty to the mining industry and preclude the profitable use of thousands of acres of central Florida land. This conventional practice also ties up millions of gallons of water for years, losing much of the retained water to evaporation. The severe economic costs of these traditional practices of handling waste clays have thus prompted the mining industry to experiment with methods that dewater the clays more rapidly.

Several dewatering methods are used to obtain a more rapid consolidation. Such procedures have been extensively described in the literature and include (a) sand spraying, (b) dredge-mix, (c) sand-clay mix, and (d) sand-clay flocculation and settling. The most economical methods include the sand-clay mix and sand-clay flocculation methods. In the sand-clay mix method, clays are settled for about a year in a large pond until they reach 15 to 18% solids. The clays are then dredged and mixed with (flotation) tailings in a ratio which, on further consolidation, yield a stable, arable soil. However, the dredging and mixing process may require another three to four years.

The sand-clay flocculation process, known as the Estach process, involves the flocculation of the sand and clay. The mixture is processed through a rake type thickener, mixed with additional sand and then pumped into a disposal area. The 12% slurry consolidates rapidly to about 30% solids in the first year and reaches the 40% level in the next three years.

As indicated above, both of these methods still require years before a mined out area can be returned to productive use. Even further, actual practice indicates that there is no universal method due to site-specifics in regard to types of clays, location of settling areas, economics, etc.

More effective dewatering methods are described in the U.S. Bureau of Mines Reports of Investigations, e.g., Investigation Nos. 8611 (Large-Scale Dewatering of Phosphatic Clay Waste from Central Florida), 8349 (Flocculation Dewatering of Florida Phosphatic Clay Wastes), and others. The investigators in those reports used several polymer flocculating agents, including polyethylene oxide (PEO) polymers and polyacrylamides. The investigators found that PEO polymer of about eight million molecular weight alone was effective as a dewatering agent. They further found that PEO polymer alone was as effective as PEO polymer and polyacrylamides combined, and was more effective than the polyacrylamides alone. See for example, U.S. Pat. No. 4,931,190 to Laros. However, while rapid dewatering is achieved using these methods, the PEO polymer is quite expensive and dewatering after 90 days still does not reach a 30% solids level.

The method described in the above-mentioned '190 patent to Laros also employs PEO polymer, but employs it in combination with a cheaper polymer such as anionic polyacrylamide flocculating agents. By employing this reportedly synergistic combination of flocculating agents in conjunction with a sand slurry, Laros reportedly is able to consolidate a sludge containing 3 to 5% solids by weight into a filter cake having an excess of 40% solids. However, Laros still requires the use of expensive PEO polymer.

Further, PEO polymer is specific in regards to the type of clays for which it will induce flocculation. Because the type of clay varies from mine site to mine site, certain sites may not be able to employ PEO polymer in their dewatering processes.

Polymer flocculating agents have also been employed in other fields of dewatering. For example, PEO polymer and acrylamide polymers have been employed in a method of dewatering organic sludges. See U.S. Pat. No. 4,710,298 to Noda et al. Noda et al.'s method employs one of these polymers with a fibrous material which prior to being added to the sludge is pressed or watered to a specific gravity of at least 0.3 g/cm$^3$. However, the method described therein cannot be economically and efficiently used to dewater sludges containing mineral solids such as phosphatic wastes.

There also has been interest in improving the methods for dewatering very fine, e.g., less than one micron, slow-settling, tailings from kaolin clay beneficiation plants. Kaolin clay, which is primarily, e.g., kalonite, is mined and beneficiated to produce kaolin particles of a quality and size suitable for fillers, filtering agents and fiber reinforcing agents in paints and plastics. A typical kaolin beneficiation process is disclosed in B. K. Asdell, "Wet Processing of Kaolin" *Society of Mining Engineers*, December 1967, pp 467–474. During beneficiation, kaolin is dispersed, degritted, e.g., to remove coarse sand and mica, and classified according to particle size. The clay is classified by, for example, centrifugation, flocculation, filtration, redispersion, magnetic separation, or vacuum filtration, followed by several other unit operations which are conducted to separate the product to required specifications. The clay not classified and used, i.e., tailings, are then discarded.

A current practice in clay beneficiation plants is to pump tailings (at about 20% solids) to an impounded settling area where these fine particles settle under gravity. As with settling phosphatic ores, decades likely are required to consolidate the tailings to a solid content high enough to reclaim the area. Certainly, the water remaining with the clay, as well as fast recovery of the land and the clays, are of economic and environmental value. Flocculation followed by mechanical dewatering has been used in the past to accelerate consolidation of kaolin tailings. Such processes, however, are generally uneconomical due to the low capacity of conventional dewatering equipment.

Tailings from aluminum production plants present similar economic and environmental issues. Conventional aluminum production employs the Bayer process and begins by digesting bauxite ores with caustic soda at high temperature and pressures. A description and illustration of the Bayer process is found in a paper which Sankey et al. presented at the 111th AIME annual meeting in Dallas, Tex. on Feb. 16, 1982. The digestion process results in soluble sodium aluminate and a residue known as "red mud." The aluminate liquor then is separated from red mud residue by primary liquor decantation and counter current decantation (CCD) washing. The latter process consolidates the red mud so that the red mud can be returned to the initial processing stages for further decantation and recovery of caustic. Once aluminate is sufficiently extracted from the red mud, the red mud residue tailings from a final CCD washing step is dewatered, as far as possible, using either deep thickeners, super thickeners or vacuum filtration. The dewatered tailings then are disposed into a tailing holding area for lengthy consolidation periods.

SUMMARY OF THE INVENTION

The present invention generally relates to dewatering methods and agents and more specifically relates to methods and agents for treating, recovering, rehabilitating and recycling mineral residue of mining operations, in particular to the removal of water and the recovery of solid particulate from aqueous mineral sludges which result from mining operations such as those described above. The method and agents of this invention thus can not only be used to expedite the reclamation of land used for settling and consolidation of phosphatic mining residue, but also used to dewater tailing residue from kaolin beneficiation plants and aluminum production plants.

In addition, by-products from the invention can be used as building material by pressing the dewatered material, e.g., by a belt filter. The combination of the dewatered mineral and microfibers discussed later below impart to the pressed material properties similar to the properties found in gypsum board. The invention therefore creates a salable product from material, e.g., phosphate ore, which in many instances has little economic value and is typically recycled back into the ground. Moreover, the by-product of this invention can comprise as little as 35% water when the dewatered sludge is dewatered by a belt filter. The by-product of this invention therefore can be dried at less expense than other processes.

One embodiment of this invention is a method of dewatering a mineral-containing aqueous sludge having a dispersed solids content, the method comprising
(a) preparing a pulp of microfibers by disintegration of a fibrous material;
(b) providing an aqueous solution or emulsion of flocculating agent;
(c) activating flocculation of the solids in said sludge by introducing to the sludge said pulp of microfibers and said aqueous solution or emulsion of flocculating agent;
(d) allowing an accumulation of flocs to form; and
(e) recovering and separating the floc accumulation from the water of the aqueous sludge by a dewatering apparatus.

The microfiber additive is prepared by disintegration of a fibrous material, such as waste newspaper or the like, into an accumulation of finely divided individual fiber elements, preferably by means of mechanical agitation, such as by suspension in a liquid and agitation by an impeller. The mineral-containing sludge can be easily consolidated into a cake comprising 25-35% solids by using this method.

As indicated above, the method of this invention can be employed in treating, recovering, rehabilitating and recycling mineral-bearing earth residue which has been extracted during a mining operation. Specifically, that embodiment of the invention comprises
(a) preparing a pulp of microfibers by disintegration of a fibrous material;
(b) providing an aqueous solution or emulsion of flocculating agent;
(c) activating flocculation of the solids in said sludge by introducing to the sludge said pulp of microfibers and said aqueous solution or emulsion of flocculating agent;
(d) allowing an accumulation of flocs to form;
(e) recovering and separating the floc accumulation from the water of the aqueous sludge by a dewatering apparatus; and
(f) returning said recovered floc accumulation to the earth.

With modification by further adding clay to the flocculating agent and microfiber additive in a manner hereinafter set forth, the method according to another embodiment of this invention can be used to dewater organic sludge as well.

DETAILED DESCRIPTION OF THE INVENTION

A unique combination of components useful in dewatering mineral sludges is provided. For instance, flocculation within a dewatering process for sludges occurs in the simultaneous presence of a pulp of finely divided individual fibrous microstructures (hereinafter "microfibers") together with a dispersed field of flocculating agent, preferably in emulsion form. The combination, when properly prepared and introduced in the manner set forth herein, causes coagulation of the solids within the sludge to form flocculates (flocs) which possess enhanced mechanical strength and size characteristics over those produced by prior art methods. Because of these important physical differences, the flocs can be readily separated and recovered by straightforward and inexpensive dewatering techniques such as by gravitational flow of flocculated sludge through a static screen or under pressure through a press. Flocs produced by prior art methods are either too small to be separated by a static screen as just described or lack sufficient mechanical integrity and thus tend to disintegrate and pass through the sieves of strainers or press apparatus.

Addition of the microfibers according to this invention has also been found to enhance the filtration characteristics of mineral residues. For example, the presence of microfibers according to this invention has led to increased throughput capacity of filter presses when dewatering flocculated kaolin tailings. If the press is run at a certain capacity, higher solid contents also are obtained, as compared to flocculated kaolin without microfibers. Dewatering kaolin tailings without flocculation has been extremely difficult.

While not being bound to any theory as to how the mechanism of the present invention provides the advantages realized thereby over the prior art, it is thought that the flocculating agent and the finely divided fibrous microstructure, when properly dispersed within the sludge in accordance with the method of the present invention, act together in a synergistic manner to cause formation of the large size, mechanically reinforced flocs. It is believed that the dispersed flocculating agents, e.g., polymers, form bridging elements between the fine particles of the suspension within the sludge to establish the basic mechanism of floc formation. It is also believed that the large surface area to volume ratio presented by the fibrous microstructure forms an extended surface on which an accumulating network of flocculating agent and particles can form and be mechanically supported. As the flocs grow to a larger size, the fibrous microstructure acts as the support matrix for the floc structure and provides mechanical reinforcement and mechanical strength.

Even further, the method according to this invention provides a way to utilize cheaper flocculating agents such as polyacrylamides and avoids the necessity of more expensive flocculating agents such as PEO polymer. The present invention also provides a dewatering method which employs relatively low concentrations, e.g., 0.1% or less, of flocculating agent. According to this method, the flocculating agent need only consist essentially of a polyacrylamide polymer and the microfiber additive.

The flocculating agent used according to this invention preferably comprises an aqueous solution or emulsion of a polyacrylamide polymer flocculating agent well known in the art. In a more preferred embodiment, the method employs a moderately anionic polyacrylamide. Such flocculating agents are commercially available from Nalco in an aqueous emulsion form known as 7877 high molecular weight polyacrylamide flocculating agent. Such emulsions also typically comprise surfactants. Polyacrylamide flocculating agents are preferred because they are much less expensive than agents such as PEO polymer, and can be used at lower concentrations. Polyacrylamide flocculating agent can be initially prepared to about 1% by weight solution or emulsion and then can be further diluted to a 0.1% or less solution or emulsion prior to addition to the mineral-containing sludge. Another suitable anionic polyacrylamide flocculant is Percol TM 156 flocculant from Allied Colloid.

Other flocculating agents which may be used are those well known in the art. See, for example, U.S. Pat. No. 4,710,298 to Noda et al. Such agents include, but are not limited to, PEO polymers, starch, polymers or copolymers of cationic acrylic monomers, vinyl imidazonines, chitosan, polyethyleneimides and epihalohydrinamine condensates.

Figure 2:
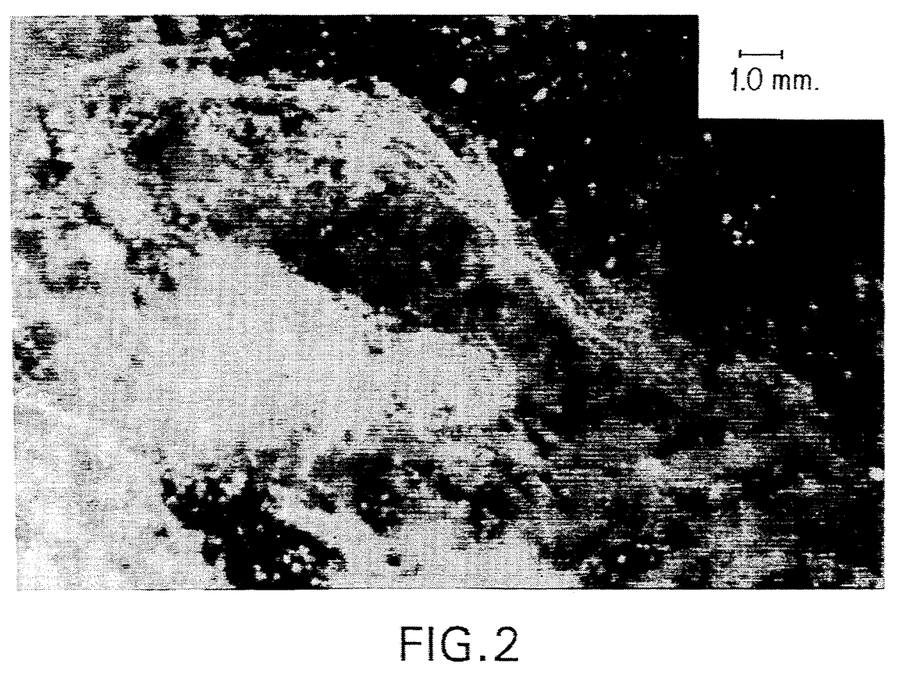
FIG. 2 is a micrograph of a flocculate which results from the dewatering method according to this invention.

Another component of the dewatering agent comprises microfibers. A "microfiber" is defined herein as a finely divided individual fibrous microstructure resulting from the disintegration of a fibrous material, preferably processed through high shear agitation. Dimensions of the fibrous microstructure depend on the material used to prepare the fibrous material. The average length of microfibers typically obtainable from high shear agitation of paper is about 7 mm. The average diameter of the fibrous microstructure is less than 100 microns and typically about 10–20 microns. However, depending on the degree of agitation and disintegration fibrous bundles having diameters of about 250 to 500 microns are also possible. See FIG. 2. Preferable sources of microfiber include, but are not necessarily limited to, organic fibrous materials such as newspapers, magazines and the like. Glass wool and cloth may be used as well.

Agitation means suitable for obtaining a pulp of microfibers include those used to disintegrate and pulp waste paper for recycling. Such agitation means comprise an impeller-equipped mixing tank. The impeller has dimensions suitable for obtaining the desired microfibers. A suitable impeller diameter dimension is about 10 inches. Ultrasonic induced vibration is another suitable agitation means.

In instances when the method employs newspaper as the source of the microfiber, it is preferable that the paper is agitated until the highest pulp density obtainable is achieved. The diameters of the original fibers used to prepare newspaper are typically less than 100 microns, and more typically about 10–20 microns.

For illustrative purposes, a method of using the above-described components is described with reference to dewatering a sludge generated from phosphatic ore mining. Generally, phosphatic sludges contain waste phosphate, bauxite, talc, clay or clay-like solids, or other solid materials such as barite. The solids in the phosphatic sludge are also referred to as "clay" or "clay solids." The particle size of such solids are generally less than about 150 mesh and frequently less than 200 mesh. These measurements correlate to a solid particle size of generally less than 50 microns and frequently less than 25 microns. The sludges generated by phosphatic mining generally contain 3–10% by weight of these solid particles and are generally removed from the mining sites in a slurry stream. When using this method, the slurry is routed toward a holding tank. Further general processing of the sludge is described below.

Before introducing microfibers to the clay sludge, a sand slurry having 20% to 30% by weight solids is optionally added to the sludge. The sand to sludge ratio is about 1:1 on a dry solids basis.

The microfiber slurry is pumped for mixture with the sludge at a precalculated rate to a clay mixing tank where the microfibers are intimately mixed with the 3–10% clay-containing sludge, and sand if present. This mixing can be accomplished with either an agitator or static in-line mixer.

Prior to addition, the preferred microfiber source, i.e., newsprint, magazine or other mixed paper, is disintegrated into microfibers by high shear agitation in water in an impeller-equipped mix tank, thereby providing a pulp or microfiber slurry. The microfiber slurry is prepared at the highest pulp density that can be practicably handled by the agitator.

The clay-microfiber mixture stream is then transferred for mixture with a stream of a 0.1% diluted polyacrylamide flocculating agent. Flocculation takes place immediately as the two streams converge and are mixed by the static mixer. Sufficient time should be allowed after the addition of the polymer flocculating agent and the microfiber in order to allow the flocs to accumulate and form as large a diameter as possible. Diameters of 2 mm or larger, e.g., 12 mm, are particularly suitable and are greatly facilitated by the presence of the microfiber additive for reasons discussed above.

In alternative embodiments, the flocculating agent can be added to the clay slurry at the same time the microfiber is added. Thus, the flocculating agent can be added simultaneously to the addition of microfiber via a separate line, or it may be mixed with the microfiber and then added as a mixture of flocculating agent and microfiber to the clay slurry.

With certain combinations of flocculating agents and sludges, e.g., kaolin clay sludges, the pH of the sludge may need to be adjusted to insure more efficient dewatering. For example, it is preferable to adjust the pH of a kaolin sludge by adding acid when using anionic polyacrylamide flocculating agent. Addition of the acid to the kaolin sludge reduces the consumption of flocculating agent. The acid or base if the sludge requires further alkalination, used to adjust the pH may be added before or simultaneously with the introduction of the clay/fiber slurry to the flocculating agent. As an alternative to adjusting the pH of the sludge, a flocculating agent which is better suited for the pH of the sludge is selected. An appropriate flocculating agent can be selected according to known parameters and routine determinations.

The flocculated slurry is then pumped to a dewatering apparatus, preferably a static dewatering screen or sieve bend, preferably a 10 mesh screen. The flocs are recovered on the screen and separated from the sludge as water passes through the screen openings. The flocs, by virtue of the strength imparted by the microfibers, are strong enough to withstand shear forces and maintain their physical integrity on the screen. The fibers also help the consolidated clays slide down the inclined screen, leaving a clean surface for the flocs that follow. The consolidated clay product resulting from screening typically contains 25 to 35% solids by weight. If a higher solids content is desired, a filter press or "squeeze" belt can be employed to increase the solids content to about 60% or more. Such squeeze devices are well known in the art.

As mentioned above, the method is preferably used with a screen. Screens are preferred for economic reasons and perform satisfactorily relative to other methods. See Examples below. However, in certain instances, other methods, e.g., filtration or centrifugation, may also be used as a dewatering apparatus.

The dewatered solid clays can then be recycled to mine cuts or reclamation areas. The method according to this invention thus provides a suitable method of recycling mineral-bearing earth extracted during mining operations.

Water removed by the dewatering screen and the other devices can then be pumped to holding tanks, or thickeners, to allow any suspended solids to settle. The clarified water (overflow) is then pumped back to a washer to be reused. Some water can be used on site for polymer dilution or pulping the fiber.

The amount of each dewatering component in the above-described method will vary, depending on the clay being processed. The amount of flocculating agent depends on the type employed. An acrylamide polymer flocculating agent will generally be used in an amount in the range of 0.2 to 2 pounds per ton of clay solids being processed. The microfiber additive should be added in an amount of at least about 5%, and preferably in the range of 5 to 15% by weight of the dry clay weight.

As an alternative to being recycled, the dewatered clays produced according to this invention may be used for other purposes, e.g., dried to form clay bricks, dried and ground to be used for kitty litter, matted as soil amendments, chemically processed to recover residual phosphate values, etc. The method also provides a suitable method of disposing of paper waste.

Depending on the purity of the dilute clay slurry being consolidated, clay/pulp products which have been belt filtered and squeezed according to this invention, and then dried, possess properties which make the squeezed product suitable for building material such as pressed gypsum board. When the by-product from the inventive process is being used as such, the microfiber content of the slurry should be at least 10% by weight, and preferably at a higher percentage, e.g., about 50% by weight. The pressed product of the process thus preferably comprises 50% by weight fiber, with the remaining material of the pressed product substantially comprising mineral solids, e.g., phosphatic ore, kaolin clay, and "red mud" residue.

Figure 1:
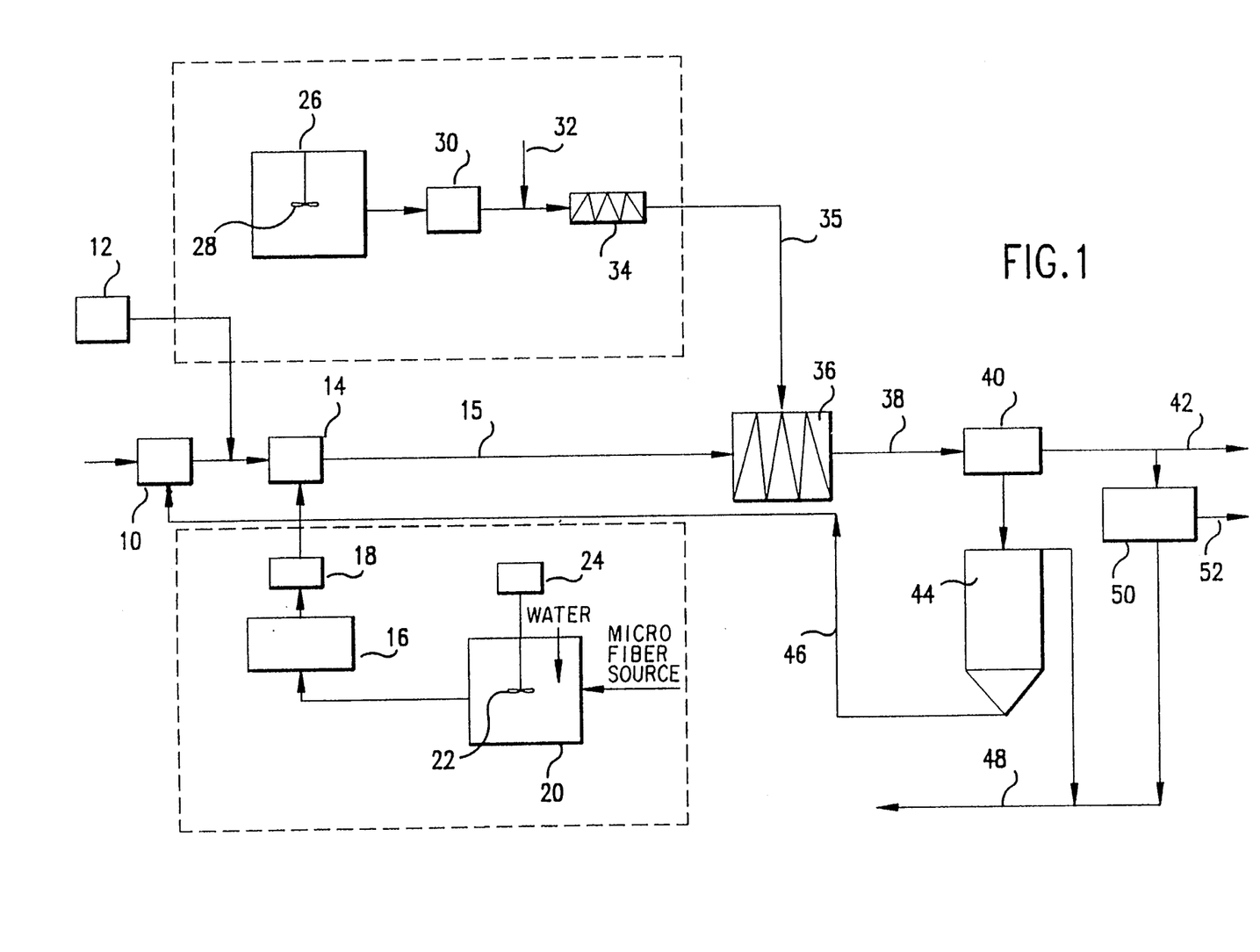
FIG. 1 is a flow sheet in schematic representation of a dewatering process employing the method according to this invention.

Description of the Embodiment of FIG. 1

Referring now to FIG. 1, there is shown a sludge dewatering system utilizing the method of the present invention. In the apparatus shown in FIG. 1, a sludge, such as the effluent from a phosphatic ore mining operation, is introduced into a holding tank 10 where it is accumulated for dewatering. The optional addition of sand is made from a sand storage tank 12 and the mixture is introduced to a mixer 14, which may be of a static or agitation type.

At this point, the microfiber is added from a microfiber slurry holding tank 16 through a metering pump 18 and the mixture of clay sludge and microfiber slurry is discharged at outlet 15. The microfiber slurry is prepared in a pulper 20 in which a fiber source, such as newsprint or other source, is mixed with water and emulsified by means of a high speed rotary cutter 22 driven by an electric motor 24.

Good results in the method of the present invention were obtained by using a proportion of about 5 pounds of paper in the form of scrap newspapers combined with about 95 pounds of water. In the embodiment shown in FIG. 1, the pulper 20 was approximately 23 inches in diameter and about 36 inches high and held about 40 gallons of microfiber slurry. The impeller was about 10 inches in diameter and was rotated at about 1725 RPM for about 0.5 hours while being driven by a ¼ HP electric motor. It was found that a suitable microfiber slurry was produced under these conditions, although it will be realized, of course, that other conditions can be selected to provide a similar result and that the present invention is not limited to the particular mechanism shown in FIG. 1.

Preparation of polymer flocculating agent is initiated in a tank 26 where it introduced in the form of an emulsion, which can be in the form in which purchased from the supplier as described above. The polymer emulsion is homogenized in the tank 26 by a rotary impeller 28 and is then removed through a metering pump 30 where dilution water is added at 32. The diluted polymer solution is then fed into a mixer 34 where it is mixed to a homogenous form and discharged as a low concentration, i.e., 0.1%, solution at 35.

The diluted polymer solution from the mixer 34 is then mixed with the clay and microfiber slurry from mixer 14 in a static mixer 36 where flocculation occurs in a manner as previously described. The floc sizes ranged from 2 to 12 mm in diameter. See FIG. 2. The flocculated sludge is then removed at 30 and is sent through a dewatering screen 40 where the flocculated clay is recovered and sent to reclamation at 42.

Water is recovered in a tank 44 along with any unrecovered portions of the clay sediment, which is allowed to settle for recirculation through the process at 46 as shown. Water is allowed to overflow from the tank 44 where it is removed at 48 and recirculated as process water.

In a typical process embodying the present invention, the recovered sludge at 42 may contain about 25% to 30% solid, which is adequate for reclamation purposes. An even higher density sludge can be recovered using a belt press mechanism 50 to remove additional water and achieve 60% or more solid content in the recovered sludge at 52. As explained above, the method of the present invention is particularly adapted to dewatering with the inexpensive screen method such as by use of the dewatering screen 40, and it is also able to withstand the more highly stressed forced removal under such methods as applied by the belt press mechanism 50.

As indicated above, an unexpected synergistic combination of components has been found for dewatering mineral sludges. For instance, a dewatering agent consisting essentially of an acrylamide polymer flocculating agent and the microfiber additive has been found to dewater an inorganic sludge more effectively than either alone. Further, a combination consisting essentially of those components is relatively inexpensive and efficient for dewatering most clay sludges. Cost savings will thus be realized over those methods which employ PEO alone or which employ PEO in combination with other flocculating agents.

While the embodiment of this invention illustrated in FIG. 1 is described with reference to dewatering clay sludges from phosphatic ore, the illustrated process can be used to dewater other mineral sludges described herein, e.g., kaolin clay and red mud sludges described herein, e.g., kaolin clay and red mud sludges. As mentioned earlier, tailings from kaolin beneficiation processes and red mud tailings are typically transferred to settling ponds or stations for consolidation. The embodiment of the invention in FIG. 1 thus can be used to expedite that consolidation. The embodiment in FIG. 1 is employed in a kaolin beneficiation plant after the plant's classification operation. With regard to aluminum production plants, the invention is used to consolidate red mud as it exits a CCD washing operation.

Other Applications

In addition to dewatering mineral-containing sludges, the methods described herein can be modified to dewater organic sludges as well. Such organic sludges include lake sediments, sewage sludge, oil and fat emulsions, etc. The method of this invention is modified by adding a clay slurry having about 3-5% dry solids to the sludge in an agitated tank or in-line mixer prior to conducting the above-described steps. The volume ratio of sludge to clay slurry preferably ranges from 1:1 to 1:5.

Alternatively, dry clays can be added to the sludge before the above-described process is repeated. The amount of dry clay can be in the range of 20 to 100% of the dry weight of the sludge. The dewatered sludge product can then either be disposed of in a landfill or used in other applications (fertilizer, for example) depending on the nature of the sludge.

Tests conducted to illustrate how various dewatering apparatus can be used with the above-described dewatering components are described in the Examples below. The tests also illustrate the effects which the invention has on dewatering methods employing the various dewatering apparatus.

In the following examples 1-3 phosphatic clay slurries from different phosphate beneficiation plants in Florida, fiber from newsprint, magazines, baby diapers, filling pulp, cotton and glass fiber, and Nalco 7877 polyacrylamide flocculant were used.

The equipment included a variable speed mixer with 2.0 inch propeller, blender, Buchner funnel for filtration, 10 mesh plastic screen cloth, solid bowl centrifuge, perforate bowl centrifuge, and Microtrack particle size analyzer.

Abbreviations have been used below. Their definitions follow:
atm—atmosphere
cc—cubic centimeter
$cm^2$—square centimeter
G—gravitational force
hr—hour
lb—pound
min—minute
sec—second
rpm—revolutions per minute

Example 1

Beaker flocculation and filtration. A calculated amount of fiber is pulped in a clay slurry using a blender. The required amount of 0.1% polymer is added to this slurry in a beaker and the mixture is stirred at 300 rpm using a variable speed mixer until flocculation is observed. Slower mixing (100 rpm) is continued for one more minute. The flocculated slurry is then filtered on a Buchner funnel using water aspirator to create vacuum of −0.5 atm.

Several tests were conducted using clays from different sources (at least six different locations) and fibers from newsprint, magazines, cotton and fiber glass. The flocculant, which is found to work well under different conditions, is 7787 high molecular weight polyacrylamide from Nalco. The following component ranges were used:
Amount of fiber/dry clay weight=5-15%
% solids (clays) by weight in the slurry=1-6%
Flocculant consumption=0.2-0.8 lb/ton clay Testing indicates that 5% is the minimum amount of fiber to clay ratio by weight that is effective in producing significant improvement in the dewatering characteristics of the flocculated clay. For instance, below 5% fiber addition, the filtration rate is as slow as the flocculated clay in the absence of fiber. Also, the product is sticky and cannot be separated easily from the filtering media. Also, the less the fiber content, the less the solids recovery on the dewatering screen. There does not appear to be any significant increase in dewatering by using more than 15% fiber.

It is believed that the polymer consumption depends on the solids concentration in the feed slurry and on the type of clays. For instance, concentrated slurries consume more polymer than the diluted clays.

The data indicated in Table I below illustrate the beneficial effects of the invention. For instance, clay slurries were dewatered (1) as received from the mines, (2) as flocculated with flocculating agent alone, and (3) as flocculated with agent and fiber.

The specific conditions for these tests follow:
Volume of clay slurry = 200 cc
% solids in slurry = 5.0% by weight
Amount of fiber = 5% of dry clay's weight
Amount of polymer = 0.6 lb/ton of dry clay
Concentration of polymer = 0.1%
Filtration area = 5.0 cm$^2$

TABLE I

Results of filtration of flocculated clays

|  | As Received Clays | Flocculated Clays | Flocculated Clays with Fiber |
|---|---|---|---|
| Filtration Rate cc/cm$^2$/min | 2.9 | 10.0 | 30.9 |
| % solids in filtered cake | 42.0 | 44.0 | 65.0 |

The data indicates that fibers enhance dewatering of phosphatic clays in terms of filtration rate and % solids in the filtered cake. The results also indicate that dewatered clays can be handled better in presence of fiber. For instance, the filter cake can be peeled easily, thus leaving clean filter media. Also, the dewatering screen does not get blinded since the material flows smoothly on the surface. Even further, the dewatered clays can be squeezed (pressed) for further dewatering without significantly breaking up the flocs. Thus, a belt press may be used if needed.

However, due to the cake thickness build-up on the filter, filtration may not be preferable for dewatering in situations where large outputs are desired.

Example 2

Small-scale continuous centrifugation tests. A five-gallon clay sample was flocculated in presence of fiber and then evaluated using the followings tests:

a—Solid bowl decanter test. Solid bowl decanter performance is evaluated by metering a sample into a basket centrifuge at different rates and gravitational levels. The supernate which reports as an overflow stream is analyzed for percent suspended solids. the cake is compacted on the bowl wall and is analyzed for percent total solids. From the data the expected percent solids, capture (recovery) and cake consistency for the centrifuge over the operating range can be determined. This data also displays the optimum retention time and gravitational force for an application.

b—Perforate bowl solids dewatering test. The perforated bowl is used to measure the maximum cake dryness possible with a given product. A thickened sample of feed is prepared to simulate the settled solids in a decanter centrifuge. This thickened material is spun in a perforated basket with an open cloth liner to measure the consistency of the cake with increasing dewatering times and at various gravitational levels.

These tests were conducted on a fiber-flocculated phosphatic clay sample. The conditions of flocculation were the same as in the beaker tests described above in Example 1 with the exception that the percentage of solids in the treated slurry was 5.93%. The size distribution of the clays, as determined by an L&N Microtrace Particle Size Analyzer, is given in Table II below.

TABLE II

Particle size distribution of phosphatic clay feed to centrifuge testing

| Size, Microns | Cumulative Weight % Passing |
|---|---|
| 27.0 | 100.0 |
| 19.0 | 91.3 |
| 13.0 | 77.7 |
| 9.4 | 60.7 |
| 6.6 | 40.7 |
| 4.7 | 29.7 |
| 3.3 | 16.2 |
| 2.4 | 6.4 |

This data indicates that the solids are very fine with an average weight diameter of 8.0 micron. The literature reports that filtration and/or centrifugation of un-flocculated samples are difficult. See Bureau of Mines "The Florida Phosphate Slimes Problem: A Review and a Bibliography," Information Circular 8868, United States Department of Interior, 1975. However, flocculation of such clays in the presence of fibers is found to enhance the dewatering characteristics of the slurry as shown in Tables III and IV below. Solid bowl decanter test results are indicated in Table III. These tests were conducted at different gravitation forces and different times.

TABLE III

Results of solid bowl decanter test as a function of force

| Sample | 1 | 2 | 3 | 4 | 5 | 6 | 7 | 8 | 9 | 10 |
|---|---|---|---|---|---|---|---|---|---|---|
| % Feed | 5.93 | 5.93 | 5.93 | 5.93 | 5.93 | 5.93 | 5.93 | 5.93 | 5.93 | 5.93 |
| % Cake | 19.4 | 25.5 | 22.9 | 23.7 | 22.8 | 23.1 | 23.3 | 28.0 | 28.2 | 27.20 |
| % Effluent | 1.06 | 0.04 | 0.34 | 2.04 | 2.75 | 0.04 | 0.04 | 0.36 | 1.52 | 0.09 |
| % Solids Recovery | 86.9 | 99.5 | 95.7 | 71.8 | 60.9 | 99.5 | 99.5 | 95.2 | 78.6 | 98.80 |
| Retention Time (Sec.) | 18 | 40 | 18 | 8 | 4 | 31 | 18 | 11 | 4 | 18 |
| Force (X G) | 250 | 750 | 750 | 750 | 750 | 2000 | 2000 | 2000 | 2000 | 2000 |

The results indicate that cakes of better than 19% solids can be obtained. Also, solids content and recovery can be increased as the force and retention times are increased. In order to measure the maximum cake dryness, a perforate bowl centrifuge was used as discussed below.

Perforate bowl solids dewatering test results are indicated in Table IV. In these tests, a thickened sample of feed was prepared to simulate the settled solids in a decanter centrifuge. This thickened material was spun in a perforated basket with an open cloth liner to measure the consistency of the cake with increasing dewatering times.

TABLE IV

Results of perforate bowl solids dewatering test as a function of time

| Sample | | | | |
|---|---|---|---|---|
| % Feed | 20 | 20 | 20 | 20 |
| % Cake | 24.6 | 31.4 | 35.7 | 38.4 |
| % Effluent | 0.2 | 0.2 | 0.2 | 0.2 |
| % Solids Recovery | 99.8 | 99.8 | 95.6 | 99.5 |
| Retention Time (Sec.) | 10 | 30 | 60 | 120 |
| Force (x G) | 1000 | 1000 | 1000 | 1000 |

The data indicate that more than 35% solids in the product can be obtained with a one minute retention time. Normally such a high percentage can only be obtained after years of natural settling in clay disposal areas.

Example 3

Static Screen Dewatering

The flocculated slurry described above for the beaker flocculation method was also dewatered using a 10 mesh plastic screen cloth. The conditions used were the same as those used in the beaker method in Example 1, except that filtration area is not relevant for screens. The results obtained are indicated below.

| | As Received Clays | Flocculated Clays | Flocculated Clays with Fiber |
|---|---|---|---|
| Recovery of total solids on screen, % by weight | 0.0 | 50.0 | 95.0 |
| % by weight of clay solids in product on screen | 0.0 | 12.0 | 25.0 |

As those results in Example 1, the results above illustrate the beneficial effect of the invention. In this Example, the tests specifically illustrate screen dewatering of clay slurries (1) as received from the mines, (2) as flocculated with flocculating agent alone, and (3) as flocculated with agent and fiber.

Example 4

Kaolin Clay Dewatering

A slurry of kaolin tailings containing 10% or less solids by weight produced by a beneficiation plant at J. M. Huber Co. in Macon, Ga. was mixed with a slurry having about of 1% by weight fiber from pulped paper to give a fiber weight percent of the dry weight of the clay of 5%, 10% and 15%. More than half, i.e., about 53%, of kaolin was about 1 micron in size (diameter). The mixture was adjusted to pH 5 using sulfuric acid.

A high molecular weight anionic flocculant such as Betz Poly ® Plus 220 flocculant or Percol TM 156 flocculant was added in an amount ranging from about 0.69 to about 0.76 lb/ton of total solids. The flocculated mass then was dewatered according to the method illustrated in FIG. 1. The final percent by weight solids was determined. Tests also were run at different belt speeds and pressures in order to calculate maximum throughput of the commercial scale units which may be used to dewater such tailings under different conditions. The test data obtained are summarized in Tables V and VI below.

TABLE V

Effect of pulp addition on filter press throughput

| % Pulp | Tons/hr. | Cake % Solids |
|---|---|---|
| 0.0 | 3.0 | 58.0 |
| 5.0 | 4.0 | 58.0 |
| 10.0 | 5.0 | 56.0 |
| 15.0 | 6.0 | 54.0 |

The results in Table V indicate that a 100% increase in throughput can be obtained by adding 15% pulp to the kaolin slurry. Addition of 5% pulp results in a 33% increase in the machine throughput, without significantly decreasing the solids content of the cake. Such an increase in the rate of throughput decreases the capital costs of dewatering tailings from kaolin beneficiation plants. Heretofore, such costs have been substantial.

TABLE VI

Effect of pulp addition on the cake solids content at a constant throughput of 2.0 ton/hr.

| % Pulp | Cake % Solids |
|---|---|
| 0.0 | 58.0 |
| 5.0 | 60.6 |
| 15.0 | 63.2 |

The data in Table VI indicate that cakes having a higher solids content result from pulp addition. The presence of pulp also facilitates discharging the cake from the belt because less water is required to wash the belt when compared to the amount of water typically used to discharge cakes which do not contain pulp.

The kaolin tailings dewatered according to this invention also pass ASTM Test 9095, a paint filter liquids test. This test measures the amount of free liquid in a material and has been used to determine compliance under 40 CFR §§264.14 and 265.14.

Example 5

Red Mud Clay Dewatering

A slurry of red mud containing 21% solids by weight was mixed with a fiber slurry to give a fiber weight percent of the dry weight of the red mud of 0%, 3.0%, 6.0%. The mixture alkalinity was adjusted to pH 10.5 by addition of 25.0 gram $Na_2CO_3$/liter of slurry.

Except as noted in Table VII below, Percol 156 anionic flocculant was added to each of the above mentioned clay/fiber slurries in an amount of 0.3 lb/ton of total solids. The flocculated mass from each of those clay/fiber slurries was dewatered on a static screen (10 mesh). The amount of solids collected on the screen, as well as the percent solid content, were determined. In cases when fiber was added, the dewatered mass could be belt squeezed for further dewatering. In one test, the squeezed product analyzed for over 70% solids by weight. The data obtained in the above tests are shown in the following table.

TABLE VII

Effect of fiber addition on dewatering red mud on a static screen

| % Fiber | fraction of solids on screen, % | Solid content in dewatered solids, % |
|---|---|---|
| 0.0 | 17.6 | 32.7 |
| 0.0 | 49.0[1] | 34.2 |
| 3.0 | 91.0 | 38.4 |

TABLE VII-continued

Effect of fiber addition on dewatering red mud on a static screen

| % Fiber | fraction of solids on screen, % | Solid content in dewatered solids, % |
|---------|----------------------------------|--------------------------------------|
| 6.0     | 96.0                             | 41.1                                 |

[1] An increased amount of 0.45 lb/ton of polymer was used in this test

It also was observed during these tests that the red mud flocs produced according to this invention did not blind the screen surface as it was processed therethrough. On the contrary, in absence of fiber, the flocs tend to stick to the screen, thereby blinding the screen in practical operations.

The flocs produced according to this invention also were shown to be less fluid than flocs produced by flocculants above. The product of this invention thus may be stacked for solar drying as reported in the literature. The invention thus can eliminate the need for a deep thickening process which has been used in conjunction with solar drying to dewater red mud. See, for example, Chandler, J. L., "Dewatering Red Mud by Deep Thickening and Solar Evaporating," *Flocculation and Dewatering*, pp. 539–548 (1988). Deep thickening processes require the addition of equipment to an overall dewatering process.

Since there are many modifications, variations and changes in details or methodology, it is intended that all matter in the foregoing description and Examples and shown in the corresponding drawings be interpreted as illustrative and not limitative.

What is claimed is:

1. A method of dewatering a mineral-containing aqueous sludge wherein the method comprises
    (a) disintegrating a fibrous material into a pulp of microfibers;
    (b) providing an aqueous solution or emulsion of flocculating agent;
    (c) activating flocculation of the solids in said sludge by introducing to the sludge said pulp of microfibers and said aqueous solution or emulsion of flocculating agent;
    (d) allowing an accumulation of flocs having an average diameter of about 2 mm or greater to form; and
    (e) recovering and separating the floc accumulation from the water of the aqueous sludge by a dewatering process.

2. A method according to claim 1 comprising providing an aqueous solution or emulsion of a polyacrylamide flocculating agent.

3. A method according to claim 1 comprising providing an aqueous solution or emulsion of 0.1% or less by weight flocculating agent.

4. A method according to claim 2 wherein said polyacrylamide is anionic.

5. A method according to claim 1 comprising introducing said flocculating agent and pulp of microfibers to a sludge containing clay solids.

6. A method according to claim 1 wherein said flocculating agent is introduced in an amount in the range of 0.2 to 2.0 lb per ton of solids in said sludge.

7. A method according to claim 2 wherein said polymer flocculating agent is introduced in an amount in the range of 0.2 to 2 lb per ton of solids in said sludge.

8. A method according to claim 1 wherein the microfibers of said pulp are introduced in an amount of at least about 5% by weight of solids in said sludge.

9. A method according to claim 5 wherein the microfibers of said pulp are introduced in an amount of at least about 5% by weight of said clay solids.

10. A method according to claim 1 comprising preparing a pulp of microfibers by disintegration of paper.

11. A method according to claim 1 wherein the mineral-containing aqueous sludge is kaolin clay or red mud.

12. A method according to claim 1 comprising introducing said aqueous solution or emulsion of flocculating agent and pulp of microfibers as a dewatering agent consisting essentially of those components.

13. A method according to claim 1 comprising recovering and separating a floc accumulation whereby said accumulation comprises 25–35% solids.

14. A method according to claim 1 comprising recovering and separating the floc accumulation from the water of the aqueous sludge by a screen.

15. A method according to claim 1 comprising recovering and separating the floc accumulation from the water of the aqueous sludge by a 10 mesh screen.

16. A method of recycling mineral solids extracted during mining operations comprising
    (a) providing an aqueous sludge of said mineral solids;
    (b) disintegrating a fibrous material into a pulp of microfibers;
    (c) providing an aqueous solution of emulsion of flocculating agent;
    (d) activating flocculation of the mineral solids in said aqueous sludge by introducing to the sludge said pulp of microfibers and said aqueous solution or emulsion of flocculating agent;
    (e) allowing an accumulation of flocs having an average diameter of about 2 mm or greater to form;
    (f) recovering and separating the floc accumulation from the water of the aqueous sludge by a dewatering apparatus; and
    (g) returning said recovered floc accumulation to the earth.

17. A method according to claim 16 comprising providing an aqueous solution or emulsion of a polyacrylamide flocculating agent.

18. A method according to claim 16 comprising providing an aqueous solution or emulsion of 0.1% or less by weight flocculating agent.

19. A method according to claim 17 wherein said polyacrylamide is anionic.

20. A method according to claim 16 comprising introducing said flocculating agent and pulp of microfibers to a sludge containing clay solids.

21. A method according to claim 16 wherein said flocculating agent is introduced in an amount in the range of 0.2 to 2.0 lb per ton of solids in said sludge.

22. A method according to claim 17 wherein said polymer flocculating agent is introduced in an amount in the range of 0.2 to 2.0 lb per ton of solids in said sludge.

23. A method according to claim 16 wherein the microfibers of said pulp are introduced in an amount of at least about 5% by weight of solids in said sludge.

24. A method according to claim 20 wherein the microfibers of said pulp are introduced in an amount of at least about 5% by weight of clay solids.

25. A method according to claim 16 comprising preparing a pulp of microfibers by disintegration of paper.

26. A method according to claim 16 comprising providing an aqueous sludge of tailings from kaolin clay.

27. A method according to claim 16 comprising introducing said aqueous solution or emulsion of flocculating agent and pulp of microfibers as a dewatering agent consisting essentially of those components.

28. A method according to claim 16 comprising recovering and separating a floc accumulation whereby said accumulation comprises 25–35% solids.

29. A method according to claim 16 comprising recovering and separating a floc accumulation from the water of the aqueous sludge by a screen.

30. A method according to claim 16 comprising recovering and separating a floc accumulation from the water of the aqueous sludge by a 10 mesh screen.

31. A method for dewatering an organic sludge wherein the method comprises
   (a) disintegrating a fibrous material into a pulp of microfibers;
   (b) providing an aqueous solution or emulsion of flocculating agent;
   (c) activating flocculation of organic solids in said sludge by introducing to the sludge said pulp of microfibers and said aqueous solution or emulsion of flocculating agent;
   (d) allowing an accumulation of flocs having an average diameter of 2 mm or greater to form; and
   (e) recovering and separating the floc accumulation from the sludge by a dewatering apparatus.

32. A method according to claim 31 comprising providing an aqueous solution or emulsion of a polyacrylamide polymer flocculating agent.

33. A method according to claim 31 comprising preparing a pulp of microfibers by disintegration of paper.

34. A method according to claim 31 comprising recovering and separating the floc accumulation from the sludge by a screen.

35. A method according to claim 31 comprising recovering and separating the floc accumulation from the sludge by a 10 mesh screen.

* * * * *